US006174343B1

(12) United States Patent
Bloomer

(10) Patent No.: US 6,174,343 B1
(45) Date of Patent: Jan. 16, 2001

(54) CAM ACTION ATTACHMENT AND LOCKING MECHANISM FOR AIR CLEANER SHELLS

(75) Inventor: Stephen F. Bloomer, London (CA)

(73) Assignee: Siemens Canada Limited Ontario (CA)

( * ) Notice: Under 35 U.S.C. 154(b), the term of this patent shall be extended for 0 days.

(21) Appl. No.: 09/342,700

(22) Filed: Jun. 29, 1999

(51) Int. Cl.[7] ............................ B01D 46/42; F02M 35/024
(52) U.S. Cl. ........................... 55/385.3; 55/493; 55/497; 123/198 E; 403/364; 403/374.5
(58) Field of Search ......................... 55/497, 493, 502, 55/503, 385.3, 495; 123/198 E; 220/324; 210/232, 238; 24/573.7; 403/364, 374.1, 374.5

(56) References Cited

U.S. PATENT DOCUMENTS

| 4,519,823 | * | 5/1985 | Kinney, Jr. et al. | 55/493 |
| 4,995,891 | * | 2/1991 | Jaynes | 55/497 |
| 5,120,334 | * | 6/1992 | Cooper | 55/385.3 |
| 5,295,602 | * | 3/1994 | Swanson | 55/502 |
| 5,605,554 | * | 2/1997 | Kennedy | 55/493 |
| 5,725,624 | * | 3/1998 | Ernst et al. | 55/502 |
| 5,900,032 | * | 5/1999 | Wang | 55/385.3 |

FOREIGN PATENT DOCUMENTS

634203 A2 * 1/1995 (EP).

* cited by examiner

Primary Examiner—David A. Simmons
Assistant Examiner—Frank M. Lawrence

(57) ABSTRACT

An air cleaner that locks two shells together by a cam action is disclosed having two shells with interlocking fingers staggered along at least one length of the joint between the first and second shells. A cam is inserted between the interlocking fingers and when rotated pulls the fingers apart and pulls the two shells together.

14 Claims, 3 Drawing Sheets

CAM ACTION ATTACHMENT AND LOCKING MECHANISM FOR AIR CLEANER SHELLS

FIELD OF THE INVENTION

The invention relates generally to air cleaner housings for motor vehicles. In particular, it relates to devices and methods for attaching air cleaner shells and compressing filter elements.

BACKGROUND OF THE INVENTION

Air cleaner housings for motor vehicles are typically arranged to support a disposable air filter element between two shells. The shells are disposed about the inlet side of the air cleaner and the outlet side of the air cleaner and serve to gather the air across the broad surface of the air cleaner and direct it to an air passageway. Adequate sealing must be provided between the edge of the two air cleaner shells and the disposable air cleaner element itself to prevent air from leaking around the side of the air cleaner element without passing through the air cleaner element and continuing on to the intake manifold and the engine. For this reason, a flexible seal is often provided between the periphery of the air cleaner and the air cleaner housing itself. The seal prevents air from bypassing around the edge of the air cleaner.

A problem with many air cleaner designs is that the seal is compressed to provide an airtight seal. Disposable air cleaner elements typically require a seal having a length of at least two linear feet (for a six inch by six inch disposable air cleaner element) and can go as large as three or three and a half feet in length. Compressing this length of seal requires a significant force. Prior art air cleaner housings have addressed this problem by being constructed as two roughly hemispherical shells, with the disposable air cleaner element sandwiched between, looking much like the popular hamburger. To replace the disposable air cleaner element, the top shell is unscrewed from the bottom shell, the disposable elements exchanged, and the top shell screwed back on the bottom shell with the new air cleaner element between. A primary drawback of this method is the need for even tensioning of the two shells together and hence the requirement of many screw fasteners evenly spaced around the periphery of the air cleaner shells coupling them together. This arrangement requires a significant amount of time to both unscrew and rescrew the connectors.

What is needed, therefore, is an improved air cleaner that is capable of more rapid air cleaner element replacement.

SUMMARY OF THE PRESENT INVENTION

In accordance with a first embodiment, an air cleaner for the combustion air of an internal combustion engine is provided, having a first air cleaner shell with a first plurality of spaced-apart fingers along the first edge thereof, a second air cleaner shell with a second plurality of spaced-apart fingers along the first edge thereof, wherein the first and second plurality of fingers are intertwined to form a passageway therebetween, and a cam shaft disposed in the passageway and abutting the intertwined fingers, to hold the intertwined fingers apart and the first and second shells together when in a first rotational position, and to permit the fingers to come together and the shells to move apart when in a second position. The air cleaner may also include a replaceable air cleaner element in the form of a panel having a first and a second side where the first side of the air cleaner element is supported by the first air cleaner shell and the second side of the air cleaner element is supported by the second air cleaner shell. The air cleaner cam shaft may include a length disposed in the passageway having an overall major width greater than an overall minor width and a handle coupled to and extending away from the camming length to rotate the camming length within the passageway. One of the first and second shells may include a surface that abuts the handle to prevent the handle from rotating in a first direction when the cam shaft is in the second position. One of the first and second shells may include a catch that abuts the handle to prevent the handle from rotating in a second direction opposite the first direction when the cam shaft is in the second position. The first plurality of fingers may be staggered with the second plurality of fingers along the first edge. The first and second plurality of fingers may define a passageway having a major width substantially parallel to a planar extent of the air cleaner element and a minor width smaller than the major width substantially perpendicular to the planar extent of the air cleaner element. The passageway may be substantially elliptical when the cam shaft is in the first position.

In accordance with the second embodiment of the invention, an air cleaner for the combustion air of an internal combustion engine is provided, including a first air cleaner shell with a first concave inner surface and a first peripheral edge, a second air cleaner shell with a second concave inner surface and a second peripheral edge and removably fixed to the first air cleaner shell, that the first peripheral edge is adjacent to the second peripheral edge about substantially the entire periphery of the first and second air cleaner shells, a removable air cleaner element disposed inside the filter housing having a third peripheral edge sealed against the first or second peripheral edges about substantially the entire periphery of the air cleaner element, a first plurality of fingers fixed to and extending from the first peripheral edge toward the second peripheral edge, a second plurality of fingers fixed to and extending from the second peripheral edge toward the first peripheral edge such that a passageway having a major and a minor width is defined between the first and second pluralities of fingers, and such that when the passageway is enlarged the first and second shells move closer together, and a cam shaft disposed between the first and second pluralities of fingers to enlarge the passageway and move the first and second shells closer together. The first and second peripheral edges may define at least first and second straight joints on imposing sides of the air cleaner and further the first and second plurality of fingers may be disposed along the first straight joint. First and second shells may be hingably coupled along the second straight joint. The first and second straight joints may be substantially parallel. The passageway may have a substantially elliptical shape when the first and second shells are in a first position and may have a substantially circular shape when the first and second shells are in a second compressed position.

In regard to a third embodiment of the invention, a method of assembling an air cleaner is provided including the steps of intertwining the first and second plurality of fingers to provide a passageway therebetween having a major width and a minor width smaller than the major width, inserting the cam shaft lengthwise into the passageway such that a major width of the cam shaft is aligned with the major width of the passageway and a minor width of the cam shaft is aligned with the minor width of the passageway, rotating the cam shaft in a first rotational direction through an arc of between 90° and 150°, and abutting a lever that is fixed to and extends radially away from the cam shaft against a surface of the air cleaner that is disposed to prevent further rotation of the cam shaft in the first rotational direction.

Other principal features and advantages of the invention will become apparent to those skilled in the art upon review of the following drawings, the detailed description and the appended claims.

Figure 1A:
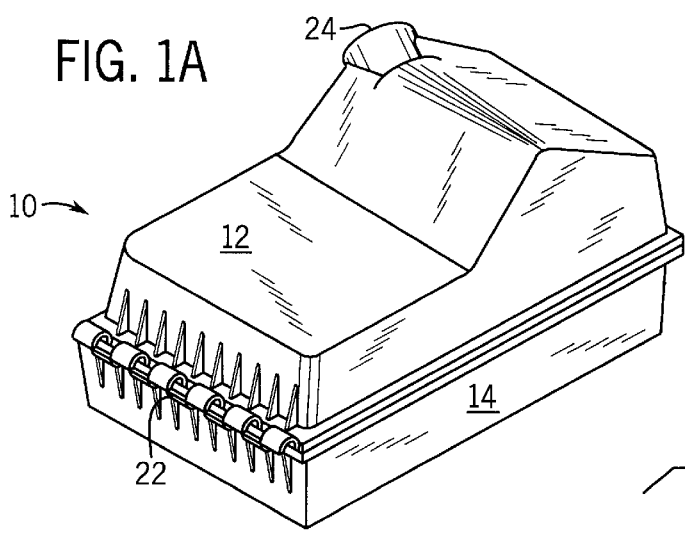
FIGS. 1A and 1B are assembled and exploded perspective views, respectively, of an air cleaner in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 1B:
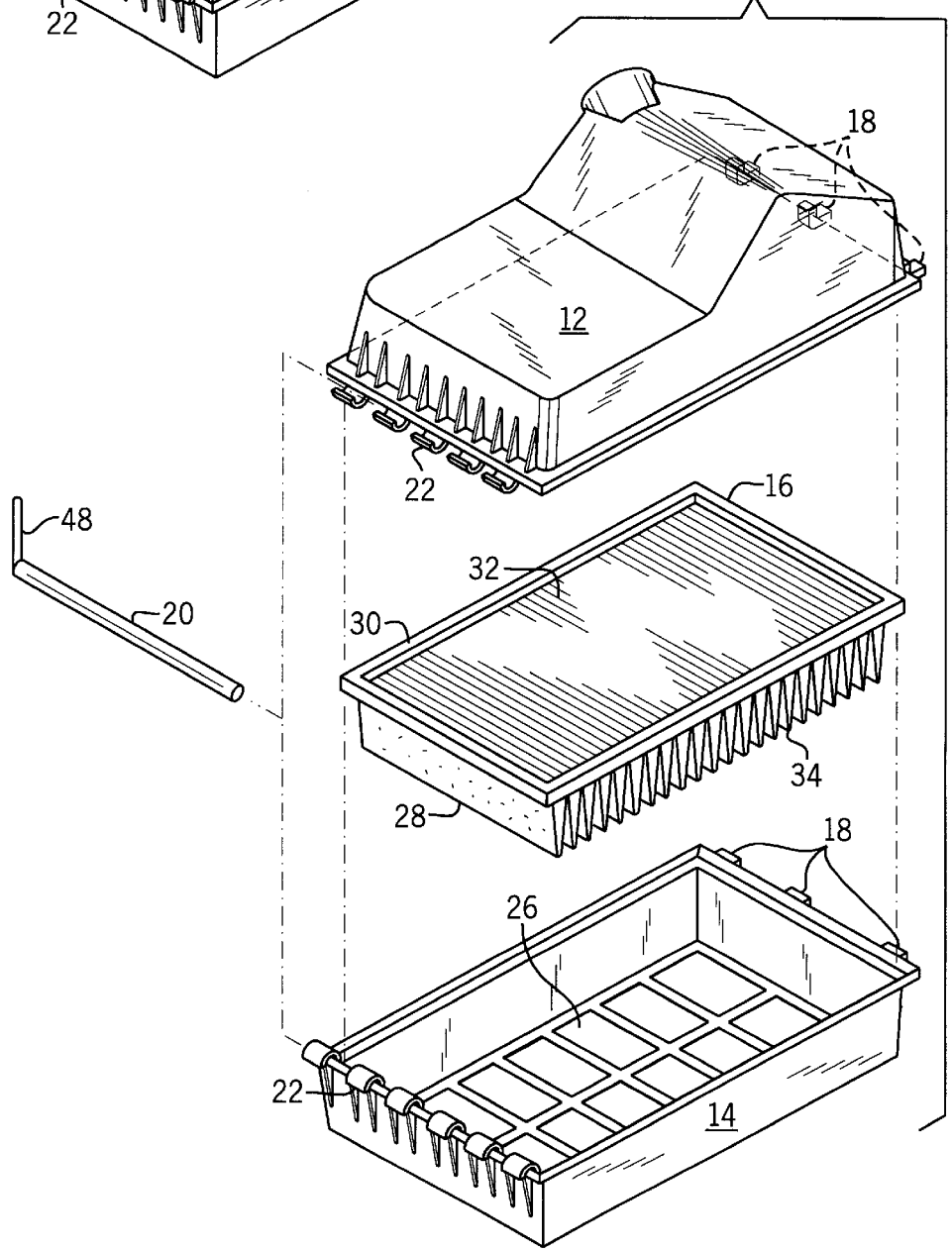

Referring to FIGS. 1A and 1B, an air cleaner 10 is shown including an upper air cleaner shell 12 and a lower air cleaner shell 14 with a replaceable air cleaner element 16 between the shells. A hinge 18 is provided at one end of the air cleaner shells 12 and 14 coupling the edges of the air cleaner shells at that end and permitting the shells to be pivotally opened. A cam shaft 20 is disposed between intertwined fingers 22 extending downward from upper air cleaner shell 12 and upwards from the lower air cleaner shell 14.

Air cleaner shells 12 and 14 define an air cleaner housing that encloses and seals against the periphery of air cleaner element 16. Upper air cleaner shell 12 has an air conduit 24 that passes through the wall of upper air cleaner shell 12 and provides a convenient mounting point for air conduits leading raw air into the air cleaner (not shown). Lower air cleaner shell 14 includes an air conduit 26 that provides a convenient coupling point for air conduits leading filtered air away from the air cleaner and to the engine.

Replaceable air cleaner element 16 includes a zigzagged paper or synthetic air cleaning medium 28 that removes particulate matter from the raw air as it passes through the cleaning medium. The periphery of medium 28 is provided with a resilient seal 30 that is typically molded to the periphery of the cleaning medium, or fixed to a rigid or semin-rigid framework that also extends about the periphery of the air cleaning medium 28. It is this seal that engages the inner walls of the air cleaner housing and prevents raw air from passing around the periphery of the air cleaner and not being cleaned.

The air cleaner element is in the form of a panel having an air receiving surface 32 and an air emitting surface 34. It is positioned within the air cleaner housing such that air is drawn through conduit 24, into the upper air cleaner shell 12, it contacts the air receiving surface 32, passes through the air cleaning medium 28 and exits the air cleaner element 16 from air emitting surface 34. The air then travels through lower air cleaner shell 14 and exits through lower air conduit 26 from whence it travels to the engine to be combined with fuel and burned.

Figure 3:
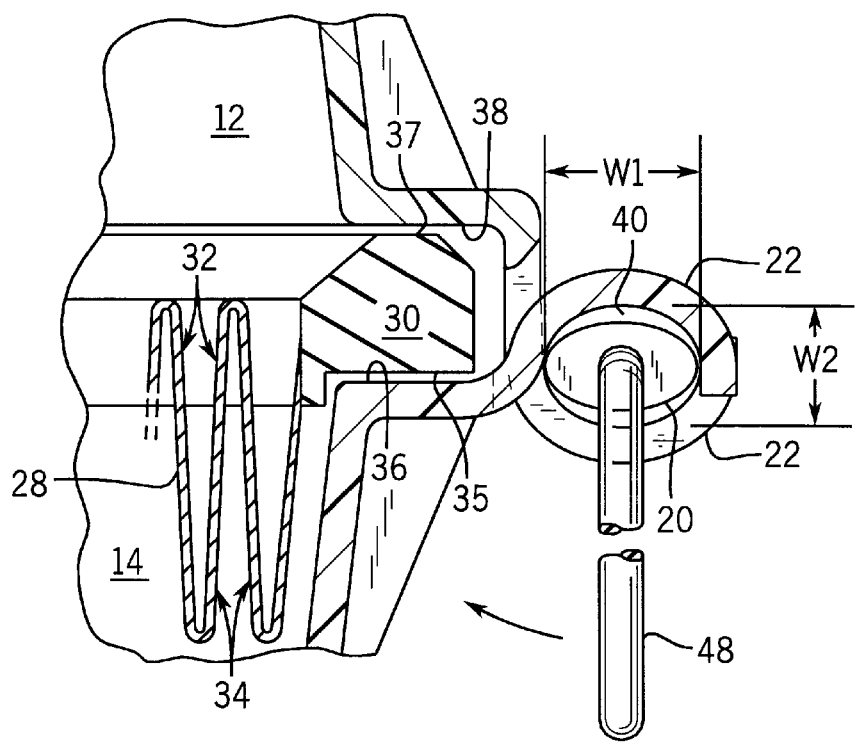
FIG. 3 is a partial cross-sectional view of the air cleaner of FIGS. 1 and 2 showing a portion of the air cleaner shells and the rotatable cam for coupling the shells in an initially inserted position.

Referring to FIG. 3, air cleaner element 16 is positioned within the air cleaner housing such that a lower surface 35 of the air cleaning element 16 is supported by an upwardly facing surface 36 of the lower air cleaner shell 14. The air cleaner element 16 is also maintained in position within the air cleaner housing by a downwardly facing surface 38 of Lipper air cleaner shell 12 that abuts upwardly facing surface 37 of air cleaner element 16. Resilient seal 30 is disposed between these surfaces and is compressed when the surfaces are forced toward one another. In the illustrated embodiment, resilient seal 30 defines both surfaces 35 and 37 abuts both upwardly facing surface 36 and downwardly surface 38. This is the preferred embodiment. It is anticipated, however, that the resilient seal need only define one of surfaces 35 and 37 to adequately block the path of raw air around the periphery of air cleaner element 16.

When an air cleaner element 16 is placed in one shell of the housing and the housing closed, the housing will typically not make adequate contact with the seal, as shown. To provide adequate contact, and thereby to prevent the flow of raw air around the edge of element 16 from the outside to the air emitting side of the cleaner element, some significant force must be applied to the upper and lower air cleaner shells 12, 14 to force them together and thereby deform the resilient seal. To provide this force, several intertwining fingers 22 are disposed on both the upper air cleaner shell 12 and the lower air cleaner shell 14. These fingers are disposed in a staggered spacing such that they intertwine when upper air cleaner shell 12 is closed on lower air cleaner shell 14 as best shown in FIGS. 1A and 3. These fingers are staggered and preferably extend substantially the entire length of the free edges from which they depend.

When the two shells are closed and the fingers intertwined, a passageway 40 is defined by the fingers into which the cam shaft 20 is inserted. This passageway has a major width W1 that is greater than a minor width W2 when the cam shaft is inserted into passageway 40. Passageway 40, because of this difference in width, has a generally elliptical shape when viewed end-on as shown in FIG. 3. The major width W1 of passageway 40 lies in a plane that is substantially parallel to the planar extent of the air cleaner element and also to the plane defined by the junction of the two air cleaner shells. Minor width W2 is substantially at a right angle to major width W1 and thus is substantially perpendicular to the planar extent of the air cleaner element and also the plane defined by the junction between the two shells of the air cleaner. As shown in FIG. 3, when the cam shaft is initially inserted into passageway 40, passageway 40 is substantially elliptical.

Figure 4:
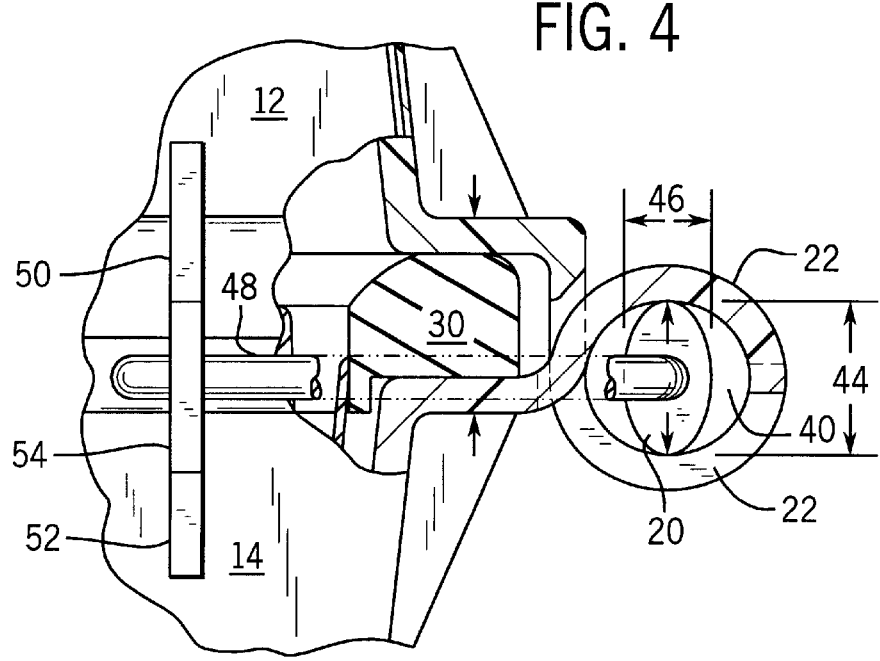
FIG. 4 shows the same cross-sectional view of FIG. 3, but with the cam in a rotated and locked position.

Cam shaft 20 has a length 42 that extends through passageway 40. Length 42 has a major width 44 greater than a minor width 46. Because of this difference between the major width and the minor width, cam shaft 20 acts as a cam when it is rotated in passageway 40. It forces the fingers apart as shown in FIG. 4 (as compared to FIG. 3) and thereby pulls upper air cleaner shell 12 and lower air cleaner shell 14 closer together. This action compresses resilient seal 30 against downwardly facing surface 38 of upper air cleaner shell 12 and prevents raw air from bypassing the air cleaner element 16. In FIG. 3, which shows the position of the assembly when the cam shaft is first inserted, the major width 44 of cam shaft 20 is substantially parallel to the major width W1 of passageway 40. Similarly, the minor width 46 of cain shaft 20 is substantially parallel to minor width W2 of passageway 40.

Figure 2:
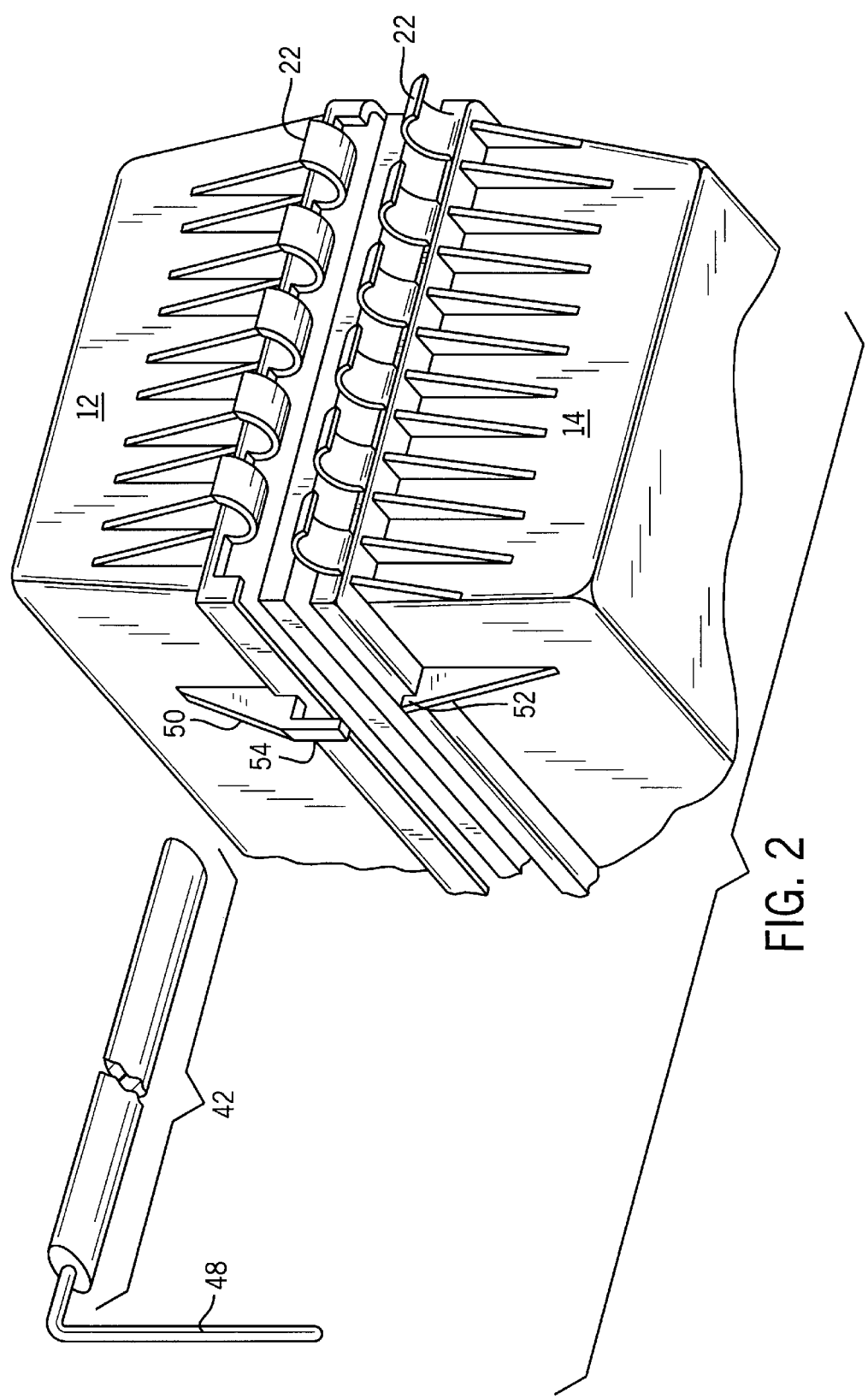
FIG. 2 is a detailed partial perspective view of one end of the air cleaner of FIG. 1 showing the interengaging fingers of the upper and lower air cleaner shells.

Cam shaft 20 includes a handle 48 that extends away from length 42 of cam shaft 20 at an angle of preferably 90° as shown in FIG. 2. This handle provides the operator with the mechanical advantage necessary to rotate cam shaft 20 in passageway 40. Once rotated, as shown in FIG. 4, handle 48 is held in its rotated position between catch 50 disposed on an adjacent edge of upper air cleaner shell 12 and stop 52 which extends from an adjacent surface of lower air cleaner shell 14. Handle 48 is prevented from rotating in a clockwise manner (as shown in FIGS. 2 and 4) because it abuts catch 50 and is prevented from rotating in a counter-clockwise manner because it abuts stop 52. In this manner, catch 50 and stop 52 prevent the rotation of handle 48, and hence hold cam shaft 20 in its locked position. To open the air cleaner housing, handle 48 is pulled outward from catch 50 flexing finger 54 outward and rotated counterclockwise from the position shown in FIG. 4 to the position shown in FIG. 3. This permits passageway 40 to collapse in size as the intertwined fingers 22 of the opposing shells move closer together, releasing the pressure applied to seal 30 and permitting cam shaft 20 to be withdrawn from passageway 40.

To assemble the air cleaner, upper air cleaner shell 12 and lower air cleaner shell 14 are closed such that the fingers of shell 12 and shell 14 are intertwined thereby providing passageway 40 therebetween. In this position, as generally shown in FIG. 3, an elliptical passageway having a major width and a minor width smaller than the major width is provided. At this point, the camming length 42 of cam shaft 20 is inserted lengthwise into passageway 40 such that the major width of the cam shaft is aligned with the major width of the passageway and the minor width of the cam shaft is aligned with the minor width of the passageway, as shown in FIG. 3. At this point, the cam shaft can be rotated clockwise to an arc of preferably between 60° and 140° which causes the major width of the cam shaft to force the intertwined fingers apart and force the shells together compressing the resilient seal. At this point, the lever will abut catch 50 which has a surface that prevents further rotation of handle 48 of cam shaft 20.

While the preferred embodiment of the invention is as described above, there are several substitutions that may be made without departing from the beneficial features of the above-described invention. For example, rather than a hinge 18, a similar arrangement of interlocking fingers and a cam shaft may be employed. This would provide for camming engagement two opposing ends of the air cleaner. The hinge may also be replaced with such well known substitutions as an interlocking tab and slot arrangement which would have the added benefit of permitting the upper air cleaner shell to be removed entirely. In the example above, a thin seal at the edge of the air cleaner was compressed between facing surfaces of the upward and lower air cleaner shells. Alternatively, the lower air cleaner shell may not support the thin seal but the bottom surface of the air cleaner.

Thus, it should be apparent that there has been provided in accordance with the present invention a cam action attachment and locking mechanism for air cleaner shells that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. An air cleaner for the combustion air of an internal combustion engine comprising:
   a first air cleaner shell having a first plurality of spaced-apart fingers along a first edge thereof;
   a second air cleaner shell having a second plurality of spaced-apart fingers along a first edge thereof, wherein the first and second plurality of fingers are intertwined to form a passageway therebetween;
   a cam shaft disposed in the passageway and abutting the intertwined fingers to hold the intertwined fingers apart and the first and second shells together when in a first rotational position, and to permit the fingers to come together and the shells to move apart when in a second position.

2. The air cleaner of claim 1, further comprising a replaceable air cleaner element in the form of a panel having a first side and a second side, wherein the first side of the air cleaner element is supported by the first air cleaner shell and the second side of the air cleaner element is supported by the second air cleaner shell.

3. The air cleaner of claim 2, wherein the cam shaft includes a camming length disposed in the passageway and having an overall major width greater than an overall minor width, and a handle coupled to and extending away from the camming length to rotate the camming length within the passageway.

4. The air cleaner of claim 3, wherein one of the first and second shells includes a surface that abuts the handle to prevent the handle from rotating in a first direction when the cam shaft is in the second position.

5. The air cleaner of claim 4, wherein one of the first and second shells includes a catch that abuts the handle to prevent the handle from rotating in a second direction opposite the first direction when the cam shaft is in the second position.

6. The air cleaner of claim 2, wherein the first plurality of fingers are staggered with the second plurality of fingers along the first edge.

7. The air cleaner of claim 6, wherein the first and second plurality of fingers define a passageway having major width substantially parallel to a planar extent of the air cleaner element and a minor width smaller than the major width substantially perpendicular to the planar extent of the air cleaner element.

8. The air cleaner of claim 7, wherein the passageway is substantially elliptical when the cam shaft is in the first position.

9. The air cleaner of claim 1, wherein the passageway has a substantially elliptical shape when the first and second shells are in a first position and wherein the passageway has a substantially circular shape when the first and second shells are in a second compressed position.

10. An air cleaner for the combustion air of an internal combustion engine, comprising:
    a first air cleaner shell with a first concave inner surface and a first peripheral edge;
    a second air cleaner shell with a second concave inner surface and a second peripheral edge and removably fixed to the first air cleaner shell such that the first peripheral edge is adjacent the second peripheral edge about substantially the entire periphery of the first and second air cleaner shells;

a removable air cleaner element disposed inside the filter housing having a third peripheral edge sealed against the first or second peripheral edges about substantially the entire periphery of the air cleaner element;

a first plurality of fingers fixed to and extending from the first peripheral edge toward the second peripheral edge;

a second plurality of fingers fixed to and extending from the second peripheral edge toward the first peripheral edge such that a passageway having a major and a minor width is defined between the first and second pluralities of fingers and such that when the passageway is enlarged, the first and second shells move closer together; and a cam shaft disposed between the first and second pluralities of fingers to enlarge the passageway and move the first and second shells closer together.

11. The air cleaner of claim 10, wherein the first and second peripheral edges define at least first and second straight joints on opposing sides of the air cleaner, and further wherein the first and second plurality of fingers are disposed along the first straight joint.

12. The air cleaner of claim 11 wherein the first and second shells are hingably coupled along the second straight joint.

13. The air cleaner of claim 12, wherein the first and second straight joints are substantially parallel.

14. A method of assembling the air cleaner of claim 1, comprising the steps of:

intertwining the first and second plurality of fingers to provide the passageway therebetween having a major width and a minor width smaller than the major width;

inserting the cam shaft lengthwise into the passageway such that a major width of the cam shaft is aligned with the major width of the passageway and a minor width of the cam shaft is aligned with the minor width of the passageway;

rotating the cam shaft in a first rotational direction through an arc of between 60° and 140°;

abutting a lever that is fixed to and extends radially away from the cam shaft against a surface of the air cleaner that is disposed to prevent further rotation of the cam shaft in the first rotational direction.

* * * * *